May 12, 1925.
W. M. CHAPMAN
AUTO SUPPORT AND JACK
Filed March 16, 1925
1,537,800
3 Sheets-Sheet 3
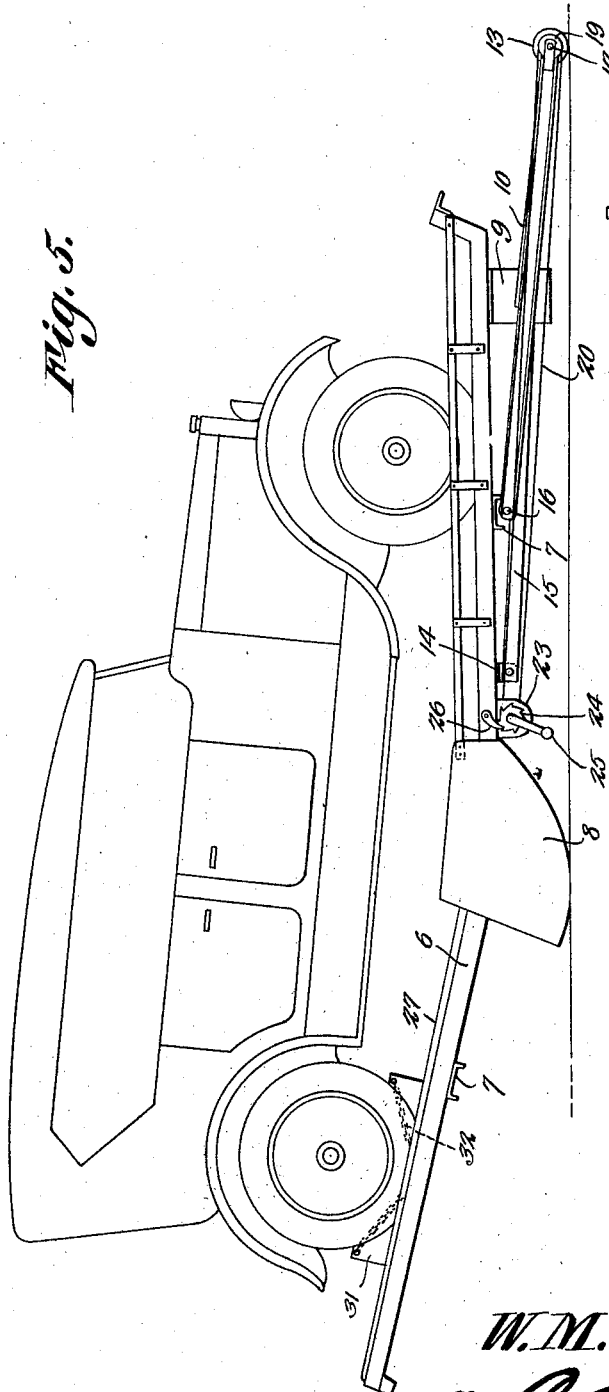
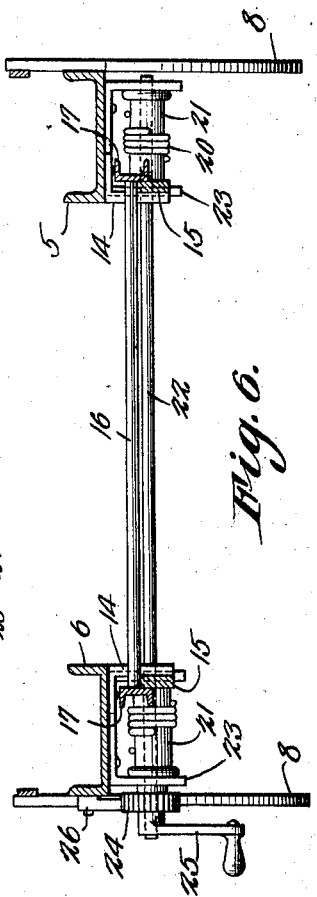
Inventor
W. M. Chapman
By C. A. Snow & Co.
Attorneys Patented May 12, 1925.

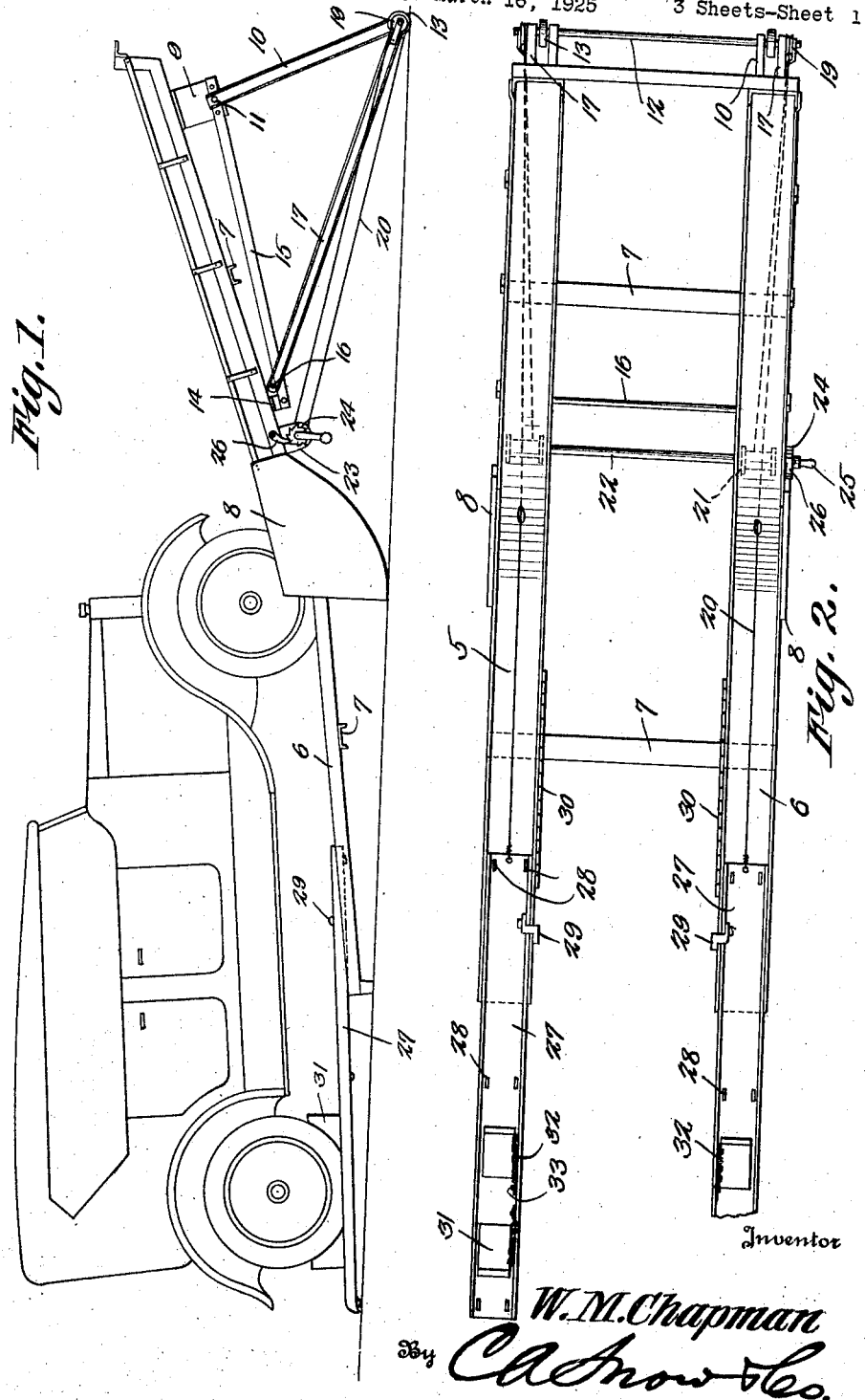

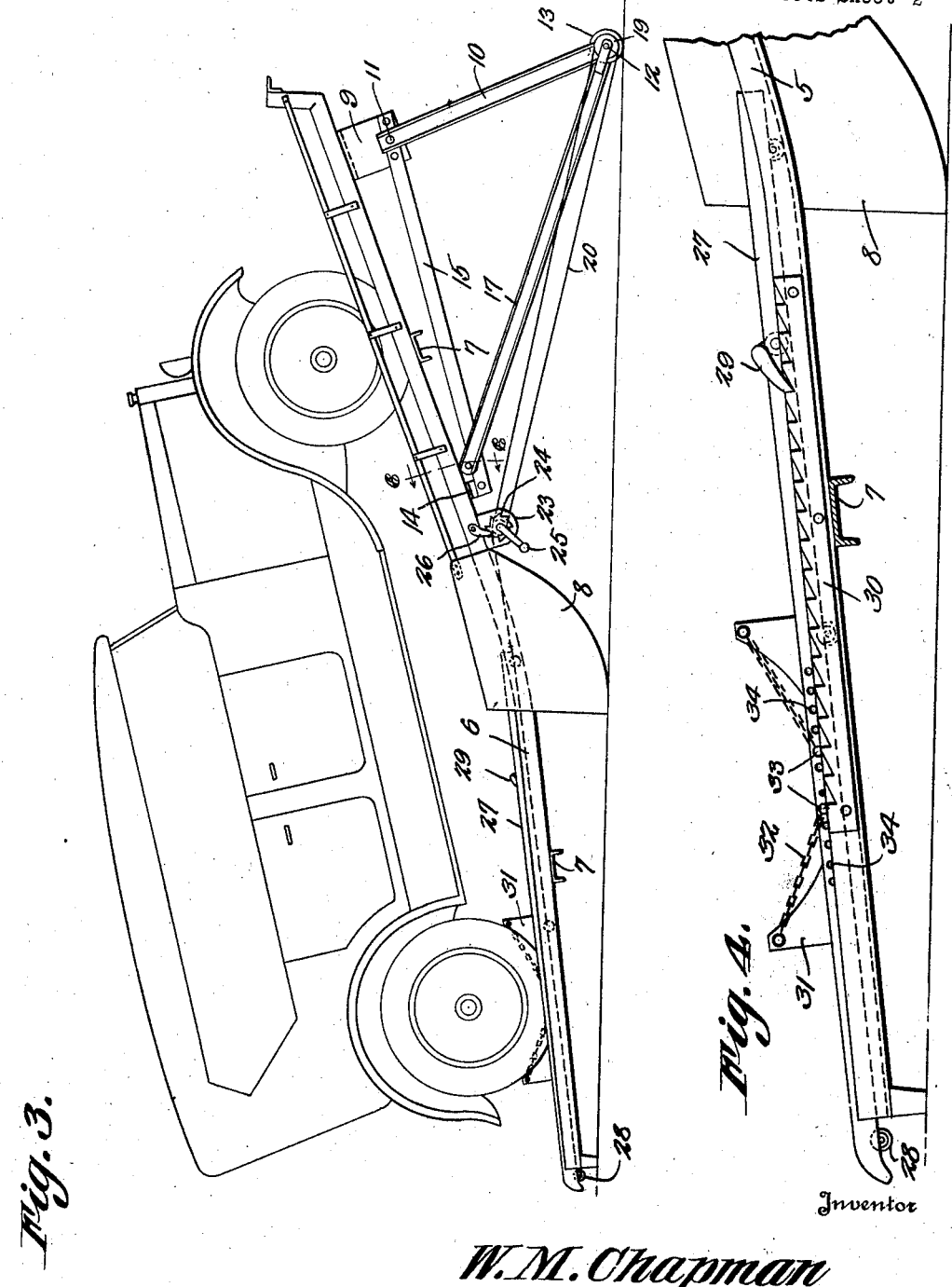

1,537,800

UNITED STATES PATENT OFFICE.

WILLIAM M. CHAPMAN, OF NEW ORLEANS, LOUISIANA.

AUTO SUPPORT AND JACK.

Application filed March 16, 1925. Serial No. 15,975.

*To all whom it may concern:*

Be it known that I, WILLIAM M. CHAPMAN, citizen of the United States, residing at New Orleans, in the parish of Orleans and State of Louisiana, have invented a new and useful Auto Support and Jack, of which the following is a specification.

This invention relates to a combined jack and support, the primary object of the invention being to provide a device of this character whereby a motor vehicle may be readily and easily elevated to a position to facilitate repair to the underside of the vehicle.

An important object of the invention is to provide a device of this character on which a motor vehicle may be run under its own power, whereupon the device may be operated to move the vehicle to a position whereby the weight of the vehicle will operate the jack to tilt the jack and support, to properly elevate the vehicle.

A still further object of the invention is to provide a device of this character which may be readily and easily operated and one which may be gradually moved to its adjusting position, eliminating any possibility of damaging the vehicle while it is being positioned on the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a device constructed in accordance with the invention illustrating a motor vehicle as positioned thereon.

Figure 2 is a plan view of the device.

Figure 3 is a side elevational view of the device showing the front portion of the vehicle as elevated.

Figure 4 is an enlarged detail view illustrating the means for automatically locking the carriage forming a part of the device.

Figure 5 is a side elevational view illustrating the device operated to elevate the rear end of a vehicle.

Figure 6 is a sectional view taken on line 6—6 of Figure 3.

Referring to the drawings in detail, the device embodies a frame including channel irons 5 and 6 respectively, which channel irons are curved at points intermediate their ends to provide upwardly extended portions disposed in opposite directions. Transversely disposed bracing members 7 connect the channel irons to insure against the channel spreading under the weight of a vehicle supported thereon.

The reference character 8 indicates rockers that are secured to the channel irons 5 and 6 to permit the device to rock under the weight of the vehicle when the supporting means to be hereinafter more fully described is operated to allow for such rocking movement.

Secured to the under surface of the channel irons 5 and 6 at a point adjacent to the outer ends thereof, is a bar 9 which provides a bracket for the arms 10 which are pivotally connected thereto at 11, the lower ends of the arms 10 being connected by the shaft 12 on which the rollers 13 are mounted.

The reference character 14 indicates bracket members that are secured to the channel irons 5 and 6 at a point adjacent to the central portions thereof, which brackets are formed with downwardly extended end portions to which the bars 15 are connected, the bars 15 providing a track or guide for the rod 16 carried at the free ends of the bars 17 forming a part of the collapsible supporting frame. The bars 17 have openings to accommodate the shaft 12.

Pulleys 19 are mounted on the outer ends of the shafts 12 and afford guides for the cables 20 that have their inner ends secured to the drums 21 that are mounted on the shaft 22. This shaft 22 is positioned in the bearings 23 that depend from the under sides of the channel irons 5 and 6.

A ratchet wheel indicated at 24 is also mounted on the shaft 22 adjacent to the handle 25, which ratchet wheel is engaged by the pawl 26 that normally falls down into engagement with the teeth of the ratchet wheel to prevent reverse movement of the ratchet wheel when the handle has been operated to wind the cable on the drum.

Openings are formed in the channel irons 5 and 6 through which openings the cables 20 pass, the cables being connected to the carriages 27 that are of widths to fit within the channel irons.

These carriages are relatively long and are supported by the rollers 28 that are mounted in suitable spaced relation with each other to properly support the weight of a vehicle positioned on the carriages.

A pawl indicated at 29 is mounted on each carriage and is adapted to engage the teeth of the rack bar 30 associated therewith, so that as the carriages are moved into the channel irons, they will be prevented from moving rearwardly under the weight of the vehicle supported thereon.

Removable chocks 31 are positioned on the carriages and are held against movement by means of the chains 32 that carry pins 33 whereby they are secured to the carriages. The pins 33 are adapted for positioning in the openings 34 so that the chock blocks may be moved various distances apart for the reception of wheels of various diameters.

In the use of the device, a motor vehicle is run onto the carriages and the rear wheels thereof held against movement by placing the chocks 31 against the rear wheels thereof in a manner as illustrated by Figure 1 of the drawings. The operating handle 25 is now manipulated to wind the cable on the drums 21 to the end that the carriages are gradually moved forwardly until they assume a position as illustrated by Figure 2 of the drawings.

The motor vehicle is now positioned with its front end elevated permitting a mechanic to examine and repair the under portion of the vehicle at the front thereof with facility.

Should it be desired to elevate the rear end of the vehicle, the pawl 26 is moved to disengage the ratchet wheel associated therewith, to the end that the bars 10, 15 and 17 or forward supporting frame gradually moved forwardly under the weight of the vehicle allowing the forward ends of the track section to move downwardly to a position as shown by Figure 5 of the drawings. With the vehicle in this position, the weight of the vehicle is sufficient to hold the rear end of the vehicle in an elevated position.

To return the device to its initial position, the operating handle 25 is again operated which movement exerts a pull on the cable to draw the forward supporting frame to a position as shown by Figure 3 of the drawings.

The chocks may now be removed and the motor vehicle backed off of the device.

I claim:—

1. A jack for motor vehicles comprising a frame including tracks formed of channel irons bent intermediate their ends to provide upwardly extended portions, rockers for supporting the intermediate portion of the frame, carriages, means for moving the carriages onto the tracks, and a collapsible supporting frame adapted to normally hold the forward end of the frame elevated.

2. A jack for motor vehicles comprising a frame, rockers disposed intermediate the ends of the frame to permit the frame to be tilted, carriages adapted to be moved onto the frame, and means for holding the ends of the frame in elevated positions.

3. In a jack for elevating motor vehicles, a main frame including tracks formed of channel irons, rockers disposed intermediate the ends of the tracks, a collapsible supporting frame positioned under one end of the main frame, carriages adapted to move onto the tracks, cables having connection with the carriages and supporting frame for moving the carriages onto the frame, and said cables adapted to elevate the supporting frame to raise the main frame.

4. In a jack for elevating motor vehicles, a frame including curved track sections, rockers disposed intermediate the ends of the track sections to permit the ends of the track sections to be elevated, carriages adapted to move onto the track sections, means for moving the carriages, and a collapsible frame adapted to operate to elevate one end of the first mentioned frame.

5. In a jack for elevating motor vehicles, a main frame including track sections bent intermediate their ends to provide upwardly extended portions, rockers secured to the main frame, carriages for the reception of motor vehicle wheels adapted to move onto the track sections, adjustable means for securing vehicle wheels to the carriages, means for moving the carriages onto the track sections, and a collapsible frame for elevating one end of the main frame.

6. In a jack for elevating motor vehicles, a main frame comprising track sections, carriages adapted to move onto the track sections, rack bars secured to the track sections, pawls carried by the carriages and adapted to engage the rack bars to restrict movement of the carriages on the tracks, and means for moving the carriages longitudinally of the track sections.

7. In a jack for elevating motor vehicles, a main frame, rockers secured to the central portion of the main frame to permit the main frame to tilt, carriages adapted to move onto the main frame, adjustable chock blocks positioned on the carriages and means for moving the carriages onto the main frame.

In testimony that I claim the foregoing as my own, I have hereto affixed my signature.

WILLIAM M. CHAPMAN.